(12) United States Patent
Wood et al.

(10) Patent No.: US 8,148,466 B2
(45) Date of Patent: Apr. 3, 2012

(54) AMPHOTERIC GRAFTED BARRIER MATERIALS

(75) Inventors: Willard E. Wood, Arden Hills, MN (US); Neil J. Beaverson, Hugo, MN (US)

(73) Assignee: Cellresin Technologies, LLC, Minneapolis, MN (US)

( * ) Notice: Subject to any disclaimer, the term of this patent is extended or adjusted under 35 U.S.C. 154(b) by 870 days.

(21) Appl. No.: 11/136,084

(22) Filed: May 23, 2005

(65) Prior Publication Data

US 2005/0261426 A1 Nov. 24, 2005

Related U.S. Application Data

(60) Provisional application No. 60/573,799, filed on May 24, 2004.

(51) Int. Cl.
  C08F 255/02 (2006.01)
  C08F 8/00 (2006.01)
  C08F 8/14 (2006.01)
(52) U.S. Cl. ........ 525/54.3; 525/54.45; 525/70; 525/74; 525/78; 525/84
(58) Field of Classification Search ................. 525/54.3, 525/54.45, 70, 74, 78, 84
See application file for complete search history.

(56) References Cited

U.S. PATENT DOCUMENTS

| | | |
|---|---|---|
| 3,318,972 A | 5/1967 | Mertzweiller et al. |
| 3,365,750 A | 1/1968 | Donald |
| 3,400,190 A | 9/1968 | Donald |
| 3,440,686 A | 4/1969 | Corbett |
| 3,476,627 A | 11/1969 | Squires |
| 3,477,099 A | 11/1969 | Lee et al. |
| 3,479,425 A | 11/1969 | Lefevre et al. |
| 3,524,795 A | 8/1970 | Peterson |
| 3,557,265 A | 1/1971 | Chisholm et al. |
| 3,583,032 A | 6/1971 | Stafford |
| 3,644,248 A * | 2/1972 | Luijk et al. ................... 524/232 |
| 4,045,833 A | 9/1977 | Mesek et al. |
| 4,068,666 A | 1/1978 | Shiff |
| 4,100,324 A | 7/1978 | Anderson et al. |
| 4,190,477 A | 2/1980 | Ossian et al. |
| 4,203,435 A | 5/1980 | Krull et al. |
| 4,275,811 A | 6/1981 | Miller |
| 4,321,977 A | 3/1982 | Tenn |
| 4,382,507 A | 5/1983 | Miller |
| 4,387,188 A | 6/1983 | Statz |
| 4,405,667 A | 9/1983 | Christensen et al. |
| 4,407,873 A | 10/1983 | Christensen et al. |
| 4,407,874 A | 10/1983 | Gehrke |
| 4,407,897 A | 10/1983 | Farrell et al. |
| 4,410,578 A | 10/1983 | Miller |
| 4,720,415 A | 1/1988 | Vander Wielen et al. |
| 4,722,815 A | 2/1988 | Shibanai |
| 4,725,657 A | 2/1988 | Shibanai |
| 4,753,832 A | 6/1988 | Brown et al. |
| 4,777,088 A | 10/1988 | Thompson et al. |
| 4,789,575 A | 12/1988 | Gibbons et al. |
| 4,818,464 A | 4/1989 | Lau |
| 4,833,202 A | 5/1989 | Dunn, Jr. |
| 4,835,025 A | 5/1989 | Thompson et al. |
| 4,859,513 A | 8/1989 | Gibbons et al. |
| 4,880,701 A | 11/1989 | Gibbons et al. |
| 4,888,222 A | 12/1989 | Gibbons et al. |
| 4,921,733 A | 5/1990 | Gibbons et al. |
| 4,929,476 A | 5/1990 | Gibbons et al. |
| 4,940,464 A | 7/1990 | Van Gompel et al. |
| 4,940,612 A | 7/1990 | Gibbons et al. |
| 4,940,621 A | 7/1990 | Rhodes et al. |
| 4,950,510 A | 8/1990 | Massouda |
| 4,981,739 A | 1/1991 | Gibbons et al. |
| 4,983,431 A | 1/1991 | Gibbons et al. |
| 5,001,176 A | 3/1991 | Nakazima |
| 5,019,073 A | 5/1991 | Roessler et al. |
| 5,084,352 A | 1/1992 | Percec et al. |
| 5,106,562 A | 4/1992 | Blemberg et al. |
| 5,108,844 A | 4/1992 | Blemberg et al. |
| 5,126,348 A | 6/1992 | McMurray |
| 5,142,750 A | 9/1992 | Dyer et al. |

(Continued)

FOREIGN PATENT DOCUMENTS

CA 2333131 12/1999

(Continued)

OTHER PUBLICATIONS

Chung, T., "Functionalization by Post-polymerization Processes," *Functionalization of Polyolefins*, Chapter 5, pp. 65-78 (Copyright 2002).
"Plexar® PX5125 Extrudable Tie Layer Resin Anhydride Modified LLDPE," *Lyondell Chemical Company*, 1 page (Dec. 31, 1994).
Ahmed, E. et al., "Flavor and Odor Thresholds in Water of Selected Orange Juice Components," *J. Agric. Food Chem.*, vol. 25, No. 1, pp. 187-191 (1978).
Berejka, "Electron Beam Grafting of Polymers." Ionicorp, Huntington, New York, pp. 85-89, *Advances in radiation chemistry of polymers*, IAEA, Nov. 2004.

(Continued)

*Primary Examiner* — Jeffrey Mullis
(74) *Attorney, Agent, or Firm* — Pauly, DeVries, Smith & Deffner, L.L.C.

(57) ABSTRACT

Thermoplastic polymer compositions, films, containers, laminates and fibers can comprise a modified polymer. The said modified polymer having a moiety comprising a half-ester reaction product of cyclodextrin and metal and/or organic group covalently bonded to some portion of the half-acid moieties. The cyclodextrin compound, grafted to the polymer structure, can scavenge impurities, permeants, or other undesirable volatile contaminants. The cooperation between the modified polymer's carboxylic acidic groups, basic groups and grafted cyclodextrin can provide active barrier properties to a film, web, fiber or other polymer structure. A permeant or a contaminant can be complexed or trapped within the polymer and held within the film, web or fiber preventing the permeant from passing into the interior of a container, or the contaminant can be scavenged from the enclosed headspace or surrounding environment.

33 Claims, 2 Drawing Sheets

U.S. PATENT DOCUMENTS

| | | |
|---|---|---|
| 5,173,481 A | 12/1992 | Pitha et al. |
| 5,190,711 A | 3/1993 | Blemberg |
| 5,213,881 A | 5/1993 | Timmons et al. |
| 5,236,642 A | 8/1993 | Blemberg et al. |
| 5,262,404 A | 11/1993 | Weisz et al. |
| 5,276,088 A | 1/1994 | Yoshinaga |
| 5,322,877 A * | 6/1994 | Moriyama et al. ............ 524/399 |
| 5,381,914 A | 1/1995 | Koyama et al. |
| 5,433,982 A | 7/1995 | Yamada et al. |
| 5,486,166 A | 1/1996 | Bishop et al. |
| 5,492,947 A | 2/1996 | Wood et al. |
| 5,508,075 A | 4/1996 | Roulin et al. |
| 5,509,915 A | 4/1996 | Hanson et al. |
| 5,516,766 A | 5/1996 | Weisz et al. |
| 5,538,655 A | 7/1996 | Fauteux et al. |
| 5,573,934 A | 11/1996 | Hubbell et al. |
| 5,576,145 A | 11/1996 | Keil et al. |
| 5,603,974 A | 2/1997 | Wood et al. |
| 5,616,353 A | 4/1997 | Wright et al. |
| 5,635,550 A | 6/1997 | Dehennau et al. |
| 5,656,368 A | 8/1997 | Braun et al. |
| 5,695,839 A | 12/1997 | Yamada et al. |
| 5,696,186 A | 12/1997 | Videau |
| 5,698,370 A | 12/1997 | Keil et al. |
| 5,714,445 A | 2/1998 | Trinh et al. |
| 5,725,917 A | 3/1998 | Parks |
| 5,760,016 A | 6/1998 | Djedaini-Pilard et al. |
| 5,773,518 A | 6/1998 | Keil et al. |
| 5,776,842 A | 7/1998 | Wood et al. |
| 5,816,487 A | 10/1998 | Skinner |
| 5,837,339 A | 11/1998 | Wood et al. |
| 5,874,419 A | 2/1999 | Herrmann et al. |
| 5,882,565 A | 3/1999 | Wood et al. |
| 5,904,929 A | 5/1999 | Uekama et al. |
| 5,916,883 A | 6/1999 | Shalaby et al. |
| 5,928,745 A | 7/1999 | Wood et al. |
| 5,939,060 A | 8/1999 | Trinh et al. |
| 5,942,452 A | 8/1999 | Daponte et al. |
| 5,964,973 A | 10/1999 | Heath et al. |
| 5,973,064 A | 10/1999 | Zhao et al. |
| 6,001,343 A | 12/1999 | Trinh et al. |
| 6,042,723 A | 3/2000 | Duval et al. |
| 6,045,812 A | 4/2000 | Richard et al. |
| 6,096,668 A | 8/2000 | Abuto et al. |
| 6,110,158 A | 8/2000 | Kielpikowski |
| 6,110,548 A | 8/2000 | Kinsey |
| 6,149,993 A | 11/2000 | Parks et al. |
| 6,177,607 B1 | 1/2001 | Blaney et al. |
| 6,191,209 B1 | 2/2001 | Andrews et al. |
| 6,193,827 B1 | 2/2001 | Parks et al. |
| 6,204,256 B1 | 3/2001 | Shalaby et al. |
| 6,207,599 B1 | 3/2001 | Coolen et al. |
| 6,211,139 B1 | 4/2001 | Keys et al. |
| 6,218,013 B1 | 4/2001 | Wood et al. |
| 6,229,062 B1 | 5/2001 | Mandell et al. |
| 6,238,284 B1 | 5/2001 | Dittgen et al. |
| 6,248,363 B1 | 6/2001 | Patel et al. |
| 6,264,864 B1 | 7/2001 | Mackay |
| 6,267,985 B1 | 7/2001 | Chen et al. |
| H2011 H | 1/2002 | Freiburger et al. |
| 6,348,258 B1 | 2/2002 | Topolkaraev et al. |
| 6,372,317 B1 | 4/2002 | Denney et al. |
| 6,379,753 B1 | 4/2002 | Soane et al. |
| 6,420,285 B1 | 7/2002 | Newkirk et al. |
| 6,465,066 B1 | 10/2002 | Rule et al. |
| 6,469,078 B1 | 10/2002 | Simon et al. |
| 6,478,174 B1 | 11/2002 | Grazia et al. |
| 6,559,081 B1 | 5/2003 | Erspamer et al. |
| 6,583,331 B1 | 6/2003 | McCormack et al. |
| 6,608,237 B1 | 8/2003 | Li et al. |
| 6,613,703 B1 | 9/2003 | Yahiaoui et al. |
| 6,632,209 B1 | 10/2003 | Chmielewski |
| 6,663,584 B2 | 12/2003 | Griesbach, III et al. |
| 6,663,611 B2 | 12/2003 | Blaney et al. |
| 6,682,512 B2 | 1/2004 | Uitenbroek et al. |
| 6,689,378 B1 | 2/2004 | Sun et al. |
| 6,709,746 B2 | 3/2004 | Wood et al. |
| 6,720,279 B2 | 4/2004 | Cree et al. |
| 6,722,106 B2 | 4/2004 | Bartel et al. |
| 6,764,566 B1 | 7/2004 | Griesbach, III et al. |
| 6,765,125 B2 | 7/2004 | Abuto |
| 6,774,188 B1 | 8/2004 | Robert et al. |
| 6,806,313 B2 | 10/2004 | Couturier |
| 6,832,418 B2 | 12/2004 | Hartgrove et al. |
| 6,846,532 B1 | 1/2005 | Bensur |
| 6,851,462 B2 | 2/2005 | Frank et al. |
| 6,894,085 B2 | 5/2005 | Beaverson et al. |
| 6,911,572 B1 | 6/2005 | Bruhn et al. |
| 6,953,510 B1 | 10/2005 | Mackay et al. |
| 6,972,010 B2 | 12/2005 | Pesce et al. |
| 6,974,890 B1 | 12/2005 | Porsö et al. |
| 6,994,698 B2 | 2/2006 | Leak et al. |
| 7,001,661 B2 | 2/2006 | Beaverson et al. |
| 7,008,207 B2 | 3/2006 | Bansal et al. |
| 7,019,073 B2 | 3/2006 | Etherton et al. |
| 7,032,362 B2 | 4/2006 | Dierl et al. |
| 7,056,310 B2 | 6/2006 | Tanaka et al. |
| 7,138,452 B2 | 11/2006 | Kim et al. |
| 7,166,671 B2 | 1/2007 | Wood et al. |
| 7,183,359 B2 | 2/2007 | Hanna et al. |
| 7,365,123 B2 | 4/2008 | Wood et al. |
| 7,385,004 B2 | 6/2008 | Wood |
| 2003/0113525 A1 | 6/2003 | Beaverson et al. |
| 2003/0207056 A1 | 11/2003 | Wood et al. |
| 2004/0037983 A1 | 2/2004 | Reighard et al. |
| 2004/0110901 A1 | 6/2004 | Wood et al. |
| 2005/0043482 A1 | 2/2005 | Etherton et al. |
| 2005/0053784 A1 | 3/2005 | Wood et al. |
| 2005/0131119 A1 | 6/2005 | Wood |
| 2005/0261426 A1 | 11/2005 | Wood et al. |
| 2006/0182917 A1 | 8/2006 | Wood et al. |
| 2006/0183856 A1 | 8/2006 | Wood et al. |
| 2006/0183857 A1 | 8/2006 | Wood et al. |
| 2006/0205873 A1 | 9/2006 | Wood et al. |
| 2007/0264520 A1 | 11/2007 | Wood et al. |
| 2008/0032110 A1 | 2/2008 | Wood et al. |

FOREIGN PATENT DOCUMENTS

| | | |
|---|---|---|
| DE | 198 25 486 A1 | 2/2000 |
| EP | 0 270 309 A1 | 6/1988 |
| EP | 0 483 380 A1 | 5/1992 |
| EP | 1 114 583 A2 | 7/2001 |
| EP | 1 559 746 A1 | 8/2005 |
| JP | 02263643 | 10/1990 |
| JP | 3-100065 | 4/1991 |
| JP | 08100027 | 4/1996 |
| JP | 2001348766 | 12/2001 |
| WO | WO-9600260 | 1/1996 |
| WO | WO-00/66187 | 11/2000 |
| WO | WO 01/02489 A1 | 1/2001 |
| WO | WO-2005019337 | 3/2005 |

OTHER PUBLICATIONS

Cancio, L. et al., "The Evolution of Microporous Film," *Nonwovens World*, vol. 13, No. 5, pp. 65-70 (Oct.-Nov. 2004).

De Roover, B. et al., "Molecular Characterization of Maleic Anhydride-Functionalized Polypropylene," *Journal of Polymer Science: Part A: Polymer Chemistry*, vol. 33, pp. 829-842 (1995).

European Search Report mailed Jul. 28, 2008.

European Search Report dated Jan. 29, 2010 from the European Patent Office in EP Patent Application No. 09173916.9, which corresponds to U.S. Appl. No. 10/672,297, filed Sep. 25, 2003, which is a parent application to the present U.S. Appl. No. 11/403,480 (3 pages).

"Fiber Systems Technology Primer, An Introduction to Spunbond and Meltblown," *Nordson Fiber Systems*, pp. 1-13 (Date Printed Jul. 28, 2006).

Japanese Office Action dated Aug. 11, 2009 from the Japanese Patent Office in JP Patent Application No. 2003-397846, mailed Aug. 24, 2009 (5 pages).

Le Thuaut et al., "Grafting of Cyclodextrins onto Polypropylene Nonwoven Fabrics for the Manufacture of Reactive Filters. I. Synthesis Parameters", Journal of Applied Polymer Science, 77:2118-2125 (2000).

Maltby, A. et al., "Fatty acid amides as torque release additives for beverage container closures," *CAD RETEC 2002 Conference sponsored by the Society of Plastics Engineers, Inc.*, Toronto, Canada, 12 pages (Sep. 30-Oct. 2, 2002).

Nachtigall, S. et al., "A Factorial Design Applied to Polypropylene Functionalization with Maleic Anhydride," *Polymer Engineering and Science*, vol. 39, No. 4, pp. 630-637 (Apr. 1999).

Ramirez, M. et al., "AFM Characterization of Surface Segregated Erucamide and Behenamide in Linear Low Denisty Polyethylene Film," *NANO Letters*, vol. 2, No. 1, pp. 9-12 (2002).

Rawls, A. et al., "Evaluation of Surface Concentration of Erucamide in LLDPE Films," *Journal of Vinyl & Additive Technology*, vol. 8, No. 2, pp. 130-138 (Jun. 2002).

Rosiak, "Radiation Polymerization in Solution." Institute of Applied Radiation Chemistry, Technical University of Lodz, Lodz, Poland, pp. 41-60, *Advances in radiation chemistry of polymers*, IAEA, Nov. 2004.

Sankhe, S. et al., "Characterization of Erucamide Profiles in Multilayer Linear Low-Density Polyethylene and Propylene-Ethylene Copolymer Films Using Synchrotron-Based FT-IR Microspectroscopy," *Applied Spectroscopy*, vol. 56, No. 2, pp. 205-211 (2002).

Schmidt, O., "Spunbond Manufacture Process Optimisation by Melt Filtration," *Gneuss Kunststofftechnik GmbH*, pp. 1-14 (Apr. 2005).

Zhang, R. et al., "Effect of the Initial Maleic Anhydride Content on the Grafting of Maleic Anhydride onto Isotactic Polypropylene," *J. Polym. Sci. Part A: Polym. Chem.*, vol. 43, pp. 5529-5534 (2005).

Zweifel, H. ,"Lubricants," *Plastics Additives Handbook*, 5th Edition, pp. 514-543 (2001).

European Search Report dated Jan. 29, 2010 from the European Patent Office in EP Patent Application No. 09173916.9 (3 pages).

Selke et al., "Plastics Packaging: Properties, Processing, Applications, and Regulations", $2^{nd}$ Edition, Hanser Publishers, Munich, pp. 3, 15, 92, 96-97, 119, 189-190, 201, 227 and 337 (2004).

Hoh, "Ionomers", The Wiley Encyclopedia of Packaging Technology, Second Edition, A Wiley-Interscience Publication, John Wiley & Sons, Inc. pp. 527-529 (1997).

Ellis et al., Polymers: A Property Database, Second Edition, CRS Press, Taylor & Francis Group, LLC, p. 693 (2009).

Moad, "Chemical modification of starch by reactive extrusion", Progress in Polymer Science, vol. 36:218-237 (2011).

\* cited by examiner

Figure 1. Solute concentration inside a volume sealed with a membrane surround by a fixed volume.

Figure 2. Closed-Volume Static Permeation Profile Illustration.

AMPHOTERIC GRAFTED BARRIER MATERIALS

RELATED APPLICATION

This application claims priority under 35 U.S.C. §119(e) to U.S. provisional application Ser. No. 60/573,799 filed May 24, 2004 incorporated by reference herein.

FIELD OF THE INVENTION

The invention relates to thermoplastic polymer materials containing cyclodextrin and an acid/base amphoteric moiety. The invention relates to polymer materials, films, polymer webs, rigid or semi rigid sheets, barrier coatings and other forms of useful polymer. The invention also relates to packaging materials, closures, containers, fibers, non-woven fabrics, and multi-component fibers.

BACKGROUND OF THE INVENTION

The development of high-performance polymer-based packaging materials, fibers, and structures has allowed the evolution of light-weight, flexible films, rigid containers, nonwoven structures and other materials that protect the contents against the ingress or egress organic vapors, aromas, moisture, oxygen and other gasses. The goal is to make the underlying technologies transparent while minimizing the financial and environmental costs of these products to the final consumer. There is still a considerable need for polymer materials and packaging systems that provide longer shelf-life stability under a wide range of storage conditions and food products. The present invention relates to barrier structures for food packages that are useful in providing extended product shelf life. The present invention also relates to porous nonwoven structures for medical, hygiene, filtration, barrier, industrial, disposable, and durable nonwoven applications that protect the contents or people from potentially malodorous, noxious or toxic vapors. Preferred nonwoven fabrics include hygiene products such as diapers, training pants, feminine absorbent articles, and the like; and as wound dressings; filtration and barrier fabrics. Textiles include active sports wear, medical or industrial garment applications. Unique high surface area nonwoven packaging materials used to remove, for example, lipid oxidation by-products to extend food shelf life.

The packaging industry is an attractive market with incredible numbers of technical challenges, e.g., flavor losses by scalping, tainting by off-odors and flavors, oxygen ingress, odor control, photodegradation (loss of value due to light sensitivity), loss of moisture, source reduction/waste recycling and environmental/social considerations. As fundamental polymer science innovations increase, the applications for new packaging expand considerably as well as the complexity of the solutions, thereby providing an ever-growing market for innovations. The exploitation of olefin polymers as a packaging material has provided substantial advantages to producers, retailers and consumers over traditional glass, aluminum and metal materials since its introduction in the 1950's. The driving force for innovation has been to develop convenient and transportable packaging to meet consumer's demand, while continuing to improve the functional properties for protecting freshness, quality and safety at an affordable price by using more innovative technologies, complex materials and structures.

Globalization of the food industry and their packaging suppliers is presenting challenges from a regulatory standpoint as materials to be exported must meet the requirements of whatever country to which the product is to be shipped. For the packaging innovator introducing novel packaging technologies represents a massive, protracted and costly undertaking. The regulatory agencies require that the materials, which are being manufactured, meet stringent safety standards for both human exposure and the environment.

Packaging materials have been the target of environmental and consumer activist groups as being a major contributor to the solid waste stream; these materials make up over one-third of the total waste generated in the United States. In many cases, manufacturers want to achieve source reduction and cost reduction by combining polyolefin layers of different barrier materials (e.g., nylon, polyvinylidene chloride —PVDC, ethylene vinyl alcohol—EVOH, etc.) to achieve the desired barrier properties and gauge; metallization of packaging films is yet another technique. In some cases, these approaches create incompatibility problems for pre-consumer in-plant scrape recycle and for post-consumer plastic recycle streams. Environmental considerations clearly influence current packaging technologies and will certainly continue to do so in the future.

In today's competitive markets, all technology innovations are driven by intense competition and therefore must meet the costs constraints and targets of the industry. The principal cost drivers in today's packaging are the raw materials. The value new, innovative technology brings to the package must be weighed against the added cost.

Polymers are used as protective barriers against malodorous, noxious and toxic chemicals. Approximately 60,000 chemicals and 2000 hazardous chemicals, as deemed by the United States Department of Transportation, are produced in the United States every year. Greater than four billion tons of these chemicals are transported annually. HazMat (hazardous materials) suits provide protection for the handlers of these chemicals. First responders, i.e., fire-rescue, require HazMat suits to respond to industrial accidents involving the aforementioned chemicals and due to the threat of terrorism, foreign or domestic. Both law enforcement and the military also use HazMat suits in readying for preparedness for chemical attacks.

BRIEF DESCRIPTION OF THE INVENTION

The invention relates to novel functional polyolefin compositions and structures that contain cyclodextrin moieties pendant on the polymer. The term "functional polymer" has two meanings: (1) a polymer bearing functional groups (such as carboxyl, or anhydride groups) which make the polymer reactive, or (2) a polymer performing a specific function for which it is produced and used. The function in the latter case is a chemical function that allows the polymer's reactive functional groups to undergo chemical reactions with permeating chemical species. A functional polymer is "a polymer that exhibits specified chemical reactivity." The functional groups of the polymer relates to the specific functions. More particularly, this invention relates to a polyolefin comprising a reaction product of a functionalized polyolefin and cyclodextrin in which the cyclodextrin is grafted onto the functionalized polyolefin. Traditional mixing apparatus can be used for the conversion. By grafting, a functional group such as hydroxyl functionality of the cyclodextrin reacts with a reactive functional group on the polymer to form a bond between the cyclodextrin and the polymer. In a preferred mode, an anhydride component of the functionalized polyolefin can be used to form a reaction product. For example, a primary hydroxyl on the cyclodextrin reacts with a maleic anhydride moiety under conditions that convert substantially all anhydride groups to a half-ester and a half-acid. In its most preferred embodiment, hydroxyl groups from cyclodextrin and a metal or an inorganic or organic base reacting with some portion of the acidic functional group following conversion of the anhydride groups to a half ester on the polymer provide a novel functional polymer that complexes/scavenges/absorbs a broad array of malodorous, noxious or toxic permeant vapors. The polymer of the invention can be fuctionalized with either a metal base or a cyclodextrin. Both the metal and the cyclodextrin have activity in the invention. Some of the half-acid groups that react with a metal base (e.g., calcium bicarbonate, calcium hydroxide, etc.) convert the carboxyl groups to carboxylates. Transition and alkaline earth (i.e., group 2 metals) metals may include barium, magnesium, calcium, aluminum, and zinc. In addition to metal bases, organic bases may be reacted with acidic groups.

The functionalized polyolefin can also contain a half-ester reaction product of cyclodextrin, and metal and/or organic groups covalently bonded to some portion of the half-acid moieties. These series of reactions create an amphoteric polymer that exhibits specific chemical reactivity.

A polymer incorporating all aspects of the invention will provide an "active" tri-functional trapping mechanism. Organic molecules are complexed/trapped in the cyclodextrin pore. Basic molecules (e.g., ammonia, amines, etc.) are scavenged with the maleic/succinic acid groups on the polymer, and acidic molecules (e.g., formic, acetic, butyric, etc.) are scavenged with the basic groups on the polymer. Therefore, the polymer of the invention can efficiently scavenge an array of potentially hazardous vapors besides providing a non-specific passive barrier.

It has quite unexpectedly been found that by such conversion it is possible to significantly change low molecular weight transport of organic compounds in conventional polyolefin polymers using parent cyclodextrins and amphoteric moieties. This invention is also a process for producing the reaction product of the functionalized polyolefin and the cyclodextrin by melt grafting with functionalized polyolefin in a customary compounding apparatus forming a compatible amphoteric grafted cyclodextrin polyolefin composition.

Amphoteric grafted polymer compositions, according to the present invention, are useful in extruded or molded structures such as thin films, laminates, semi-rigid films and rigid containers as well as fibers. For instance, these structures provide complexing/scavenging/absorbing properties for a sealant layer in flexible food packaging, a beverage contact layer for cartons and bottles, plastic closures and sealing element layers for bottle and jars for sauces, soups, puddings, baby food and wine, and polymers used to manufacture fiber, textile, and nonwoven compositions for disposable diapers. Polyethylene/polypropylene bicomponent, functionalized sheathed fibers could be incorporated into multilayered fabrics. Besides absorbing malodors, these fibers could absorb potentially hazardous vapors, for example, in protective suits for HazMat, industrial, military, and law enforcement applications. The invention provides an "active" barrier, as opposed to a "static" barrier, to noxious or toxic gases.

The invention provides a polyolefin having a grafted cyclodextrin to diminish regulatory concerns because the active groups covalently bonded to the polymer eliminating food safety concerns related to migration. The present invention provides an innovative active barrier material with significant property improvements and compatibility with source reduction, in-plant scrape recycle and post-consumer recycling.

The invention forms a compatible cyclodextrin (CD)/amphoteric polyolefin composition by grafting a parent, unmodified cyclodextrin onto a polyolefin using extrusion processing to reduce both material, manufacturing and regulatory costs and to lessen the impact on the environment. The invention also forms an "active" polymer barrier by the reaction of metal and/or organic bases with functional acidic groups. A polymer derived from both the cyclodextrin grafted onto a polyolefin and from the reaction between metal and/or organic bases with functional acidic groups provides a tri-functional molecule trap, Non-reactive molecules can be trapped in the pores of cyclodextrin. Basic molecules can be trapped by the maleic/succinic acid groups on the polymer, and acidic molecules can be trapped by the basic metal groups on the polymer. Therefore, the polymer of the invention can trap noxious and/or potentially hazardous vapors besides providing a non-specific barrier.

The invention also provides a commercial polyolefin material having greater crystallinity and lower surface energy to effectively change the partitioning of compounds in direct contact with the polymer especially nonpolar compounds (e.g., alkanes, aromatic, terpenes and sesquiterpenes).

DETAILED DESCRIPTION OF THE INVENTION

Briefly, the invention comprises a polyolefin covalently bonded to a CD. The CD can be reacted with a functionalized polyolefin. Polyolefins with a reactive anhydride group can be used to covalently bind CD. One version is a modification or functionalization of polyolefins where a peroxide initiator is used with various unsaturated polar monomers to add chemically reactive moieties on the polymer. This has an important and unexpected application when used in combination with a group of compounds in this present invention known as cyclodextrins.

Cyclodextrin (CD) is a cyclic oligomer of α-D-glucose formed by the action of certain enzymes such as cyclodextrin glycotransferase (CGTase). Three cyclodextrins (alpha, beta, and gamma) are commercially available consisting of six, seven and eight α-1,4-linked glucose monomers, respectively. The most stable three-dimensional molecular configuration for these oligosaccharides is a toroid with the smaller and larger opening of the toroid presenting primary and secondary hydroxyl groups. The specific coupling of the glucose monomers gives the CD a rigid, truncated conical molecular structure with a hollow interior of a specific volume.

Commercial polyolefin functionalization is achieved using solution, melt and solid state routes known in the art. The process covalently bonds monomers onto vinyl polymers or onto polyolefin polymers including copolymers of olefins with other monomers, such as vinyl monomers, which predominately constitute the olefin portion. Polyolefins useful in this invention include poly(ethylene) or PE, poly(propylene) or PP, poly(ethylene-co-propylene) or PEP, ethylene vinyl acetate or EVA, ethylene/methyl acrylate copolymer, and ethylene/ethyl acrylate copolymer. The polyolefins can be functionally modified with unsaturated compounds such as unsaturated anhydrides and carboxylic acids. Additionally, there are terpolymers of ethylene-acrylate (ethyl or butyl)-maleic anhydride.

Functionalized polyolefins have extensive industrial applications such as coextrusion tie resins in multi-layer films and bottles for the food industry, compatibilizers for engineering polymers and plastic fuel tank tie resins for the automotive industry, flexibilization and compatibilization of halogen free polymers for cables and for filler materials used in roofing construction. Functionalized polyolefins useful in the present invention are maleated polyethylene and polypropylene (Orevac™ and Lotryl™ from ATOFINA, Plexar® resins from EQUISTAR, Fusabond® resins from DuPont, OPTM resins from MÂNAS, and EXXELOR™ from Exxon/Mobil), functionalized EP, EVA and EPDM (such as ethylene-propylene-butadiaene or, ethylene-propylene-1,4-hexadiene polymers) ethylene-octene copolymers, ethylene-n butyl acrylate-maleic anhydride, ethylene-ethylacrylate-maleic anhydride terpolymers and the like. The ethylene-propylene-1,4-hexadiene polymer can be represented as:

wherein x, y and z are selected to obtain about 70 to 90 wt % ethylene, about 10 to 30 wt % propylene and up to about 5 wt % 1,4-hexadiene. The vacant bonds are linked to similar groups, H, or end groups.

The olefinic compositions of the invention with pendent CD moieties can be extruded, laminated or molded into a variety of useful films, sheets, closure liners and caps, structures or shapes using conventional processing technology.

Compositions of this invention may be prepared using reactive extrusion by feeding a dry cyclodextrin, or derivative thereof, (<0.10% moisture), a functionalized polyolefin and optionally a second polyolefin, into an extruder at temperatures such that the cyclodextrin reacts with the functionalized polyolefin as the molten polymer and cyclodextrin are transported through the extruder to form a reaction product containing, for example, an ester group which covalently bonds the cyclodextrin to the polyolefin. The ratio of functionalized polyolefin to non-functionalized polyolefin can be adjusted for a specific application and conversion process. The present invention is directed to a stoichiometric reaction product of a cyclodextrin and a graft linking agent (i.e., anhydride), resulting in a modified polymer especially suited as a master batch which can be subsequently let down with one or more non-functionalized thermoplastic polymers and thermoplastic elastomers at a weight ratio of one (1) parts of the master batch composition to ten (10) to twenty (20) parts of non-functionalized polymer. In other words the blend of polymer and master batch, or functionalized polymer, after blending can contain about 0.001 to 10 wt % of the base or CD functionalized polymer, in certain applications the polymer can contain about 0.002 to 8 wt % of the base or CD functionalized material, about 0.002 to 5 wt % of the base or CD functionalized material or about 0.002 to 2 wt % of the base or CD functionalized material. The blend of polymer and master batch, or functionalized polymer, using only the metal base, after blending can contain about 0.001 to 1 wt % of the base functionalized polymer, in certain applications the polymer can contain about 0.002 to 8 wt % of the base functionalized material, about 0.002 to 5 wt % of the base functionalized material or about 0.002 to 2 wt % of the base functionalized material.

A maleic acid, fumaric acid or maleic anhydride functionalized material is useful for bonding CD or base to the polyolefin. The stoichiometric ratio for melt grafting is calculated on a gram-mole (gram-formula-weight) basis where one (1) gram-mole of base or CD ($\alpha$, $\beta$ or $\gamma$) is equivalent to one (1) gram-mole the grafted anhydride and carboxylic acid moiety.

Fumaric acid can be used as the grafting agent by rearranging and dehydrating fumaric acid as shown:

Maleic anhydride can be grafted onto the olefinic polymer using an "ene" reaction in which the olefinic character of the polymer reacts with maleic anhydride to add the anhydride to the polymer chain, the reaction is exemplified, in the model structure, as follows:

Maleic anhydride can be grafted onto the olefinic polymer using a free radical reaction by cleaving the polyolefin forming a free radical that can combine with maleic anhydride to form the grafted anhydride, the free radical mechanism is exemplified as follows:

resulting in a grafted material. The reaction can occur at either a backbone unsaturated carbon or at an unsaturated carbon in group pendant to the polymer backbone.

The inventive composition can be processed by any of the conventional blending or compounding processes known for blending particulate into polymer in the thermoplastic processing arts. The CD grafting process of the subject invention is carried out in any conventional batch mixer, twin screw or single screw extruder capable of melting and homogeneously mixing the components of the process to produce a covalent bonded CD. The grafting reaction is conveniently carried out in the extruder or mixer of the invention. The preferred twin-screw compounder is configured with multiple barrel segments for inline additive compounding and optional devolatilization. A feeder, preferably a gravimetric feeder, is used to feed the functionalized polyolefin into the first barrel zone of the extruder. A second additive feeder, either gravimetric or volumetric, is used to feed dry cyclodextrin into the first barrel zone. Care must be taken during the compounding process to prevent atmospheric moisture sorption by the CD. The twin-screw compounder is setup with two kneading sections. The kneading sections are spaced along the screw so the first kneading section melts the resin and mixes it, and the second kneading section allows dispersive mixing with minimal shear of resin. The conveying section in the first zone has increasing element pitch followed by dispersive screw elements. Following the dispersive section, a short section is used to convey the melt without increasing temperature and upstream of the distributive mixing elements a thermoplastic master batch containing a metal base or organic base is gravimetrically fed. A diluting polymer can be gravimetrically fed at this point to adjust the concentration of the functional polymer content of the master batch. After the second distributive mixing section, the composition exits the compounder. The resin may be devolatilized by drawing a vacuum in a downstream barrel segment before the resin is pumped out through a strand die. The molten polymer strands are run into a water bath and two air wipes before entering the strand cutter. The goal of the compounding step is to minimize moisture introduction while ensuring a consistent feed of the cyclodextrin with good dispersion in the functionalized resin.

In the present invention, in preparing a functionalized polyolefin/CD master batch, using a cyclodextrin material having reduced or low moisture content is important. When a master batch composition is produced, it can pick up some water in the water bath and may require drying in a hot air fluidized bed, an air oven or a vacuum oven prior to use in a conversion process. The downstream process, as well as the application, dictates the residual moisture content of the master batch. After the master batch is compounded, the CD moisture content can be varied to accomplish various aspects of the invention. Surprisingly, the barrier properties of a material made of a functionalized polyolefin/CD master batch letdown into virgin matrix material are not maximized if dry cyclodextrin material is used. The absence of cyclodextrin moisture leads to greater complexation of residual impurities inherent in all thermoplastic resins. The presence of some moisture in the cyclodextrin reduces complexation during the compounding and conversion processing steps. Cyclodextrin moisture levels between 0.5% and 2% in the master batch will generally minimize or substantially prevent residual resin impurity complexation. Further, these levels of cyclodextrin moisture do not adversely affect polymer morphology or cause other adverse barrier affect such as matrix pinholes, microscopic voids, etc. The presence of some moisture in the cyclodextrin does not impede or reduce inclusion complex formation with diffusing permeants.

Chemically grafting CD molecules onto functionalized polyolefin polymers economically produces a barrier or selective barrier structure with tailorable properties based upon the CD pore size ($\alpha$, $\beta$, $\gamma$), whether the CD is unmodified or modified, and the concentration of the grafted CD in the finished polymer. These unique properties include reducing the transport of low molecular weight impurities inherent in polymers, improving the intrinsic organic vapor barrier properties of the polymer, changing the surface energy of the polymer and thereby change polar and nonpolar organic partitioning at the interface, and increasing polymer crystallinity an important polymer characteristic especially in olefinic polymers. These property improvements significantly add value to commercial commodity resins. These enhancements come with additional benefits not achievable with compatible cyclodextrin derivatives—pendent moieties or substituents that render the CD material compatible with the thermoplastic polymer—known in the art (U.S. Pat. Nos. 5,492,947, 5,603,974, 5,837,339 and 5,928,745) which also achieve reduced migrants and barrier properties. The present novel CD grafted polymers have additional benefits that include significant changes in the polymer's surface energy, increased polymer crystallinity, significantly lower implementation costs, fewer regulatory safety concerns and, in some cases, a "greener" more environmentally/socially responsible barrier polymer.

For this invention, a compatible CD means the CD material contains at least one pendent group capable of reacting with either an anhydride functionalized polyolefin. Additionally, the CD material can be uniformly dispersed into the melted functionalized polyolefin, can reside in the polymer without reductions in the intrinsic barrier properties of the polyolefin, and can retain the ability to trap or complex diffusing permeants or polymer migrant impurities, and can change the surface energy of the polymer, organic molecule partitioning and improve polymer crystallinity.

We have found that polyolefin incompatible CD, like unmodified $\alpha$, $\beta$ and $\gamma$-CD can be dispersed into functionalized polyolefins, covalently bonded to the functionalized polyolefin forming a compatible composition without decomposition of the unmodified CD during compounding or during subsequent conversion steps. Further, we have found that functionalized polyolefins with covalently bonded unmodified CD do not cause melt fracture by visual inspection of the extrudate. Lastly, cross-sectioned polyolefin extrudate examined by optical microscopy is shown to be free of CD agglomerates.

Cyclodextrin

Cyclodextrin is a cyclic oligosaccharide consisting of at least six glucopyranose units joined by α (1→4) linkages. Although cyclodextrin with up to twelve glucose residues are known, the three most common homologs (α cyclodextrin, β cyclodextrin and γ cyclodextrin) having 6, 7 and 8 residues have been used.

Commercially cyclodextrin is produced by a highly selective enzymatic synthesis. They consist of six, seven, or eight glucose monomers arranged in a donut-shaped ring, which are denoted α, β, or γ cyclodextrin respectively (See FIGS. 1A, 1B and 1C, respectively). The specific coupling of the glucose monomers gives the cyclodextrin a rigid, truncated conical molecular structure with a hollow interior of a specific volume. This internal cavity, which is lipophilic, is attractive to hydrocarbon materials when compared to the exterior and is a key structural feature of the cyclodextrin by providing the ability to complex molecules (e.g., aromatics, alcohols, halides and hydrogen halides, carboxylic acids and their esters, etc.). The complexed molecule must satisfy the size criterion of fitting at least partially into the cyclodextrin internal cavity, resulting in an inclusion complex.

| CYCLODEXTRIN TYPICAL PROPERTIES | | | |
|---|---|---|---|
| CD PROPERTIES | α-CD | β-CD | γ-CD |
| Degree of polymerization (n=) | 6 | 7 | 8 |
| Molecular Size (A°) | | | |
| inside diameter | 5.7 | 7.8 | 9.5 |
| outside diameter | 13.7 | 15.3 | 16.9 |
| height | 7.0 | 7.0 | 7.0 |
| Specific Rotation $[\alpha]^{25}D$ | +150.5 | +162.5 | +177.4 |
| Color of iodine complex | Blue | Yellow | Yellowish Brown |
| Solubility in Distilled water (g/100 mL) 25° C. | 14.50 | 1.85 | 23.20 |

The oligosaccharide ring forms a torus, as a truncated cone, with primary hydroxyl groups of each glucose residue lying on a narrow end of the torus. The secondary glucopyranose hydroxyl groups are located on the wide end. The parent cyclodextrin molecule, and useful derivatives, can be represented by the following formula (the ring carbons show conventional numbering) in which the vacant bonds represent the balance of the cyclic molecule:

wherein $R_1$ and $R_2$ are primary or secondary hydroxyl as shown.

The CD's internal cavity size (i.e., α, β, γ) must be considered and the functional group modification must be suitable for changing the desired bulk polymer and surface polymer characteristics in addition to forming an inclusion complex with targeted volatiles or impurities. To achieve a specific result, more than one cavity size and functional group may be necessary.

According to the present invention, the cyclodextrin is a compound substantially free of an inclusion complex. For this invention, the term "substantially free of an inclusion complex" means that the quantity of the dispersed CD material in the bulk polymer contains a large fraction having CD free of a polymer contaminant in the central pore of the cyclodextrin ring (see FIG. 1A). The central pore is used as a binding location for permeants. Once used the central pore can acquire a permeant or other inclusion compound but some complexing can occur during manufacture. Such complexing can occur as residual polymer impurities and degradation materials become the inclusion compound in the CD inclusion complex.

CD molecules have available for reaction with a functionalized polyolefin the primary hydroxyl at the six position of the glucose moiety, and at the secondary hydroxyl in the two and three positions. Because of the geometry of the CD molecule, and the chemistry of the ring substituents, all hydroxyl groups are not equal in reactivity. However, with care and effective reaction conditions, dry CD molecule can be reacted to obtain grafted CD. CD with selected substituents, i.e. substituted only on the primary hydroxyl or selectively substituted only at one or both the secondary hydroxyl groups, can also be grafted if desired. Directed synthesis of a derivatized molecule with two different substituents or three different substituents is also possible. These substituents can be placed at random or directed to a specific hydroxyl. Further, CD alcohol derivatives (e.g., hydroxyethyl and hydroxypropyl) and amino derivatives can be reacted to make a grafted CD.

The preferred preparatory scheme for producing a grafted CD polyolefin material having compatibility with polyolefin resin involves reactions at the primary or secondary hydroxyls of the CD molecule. It is meant that a hydroxyl functionality of the CD reacts with the anhydride or expoxide component of the functionalized polyolefin to form a reaction product. The formation of an ester or ether bond on either the primary or secondary ring hydroxyls of the CD molecule involve well-known reactions. Further, CD having less than all of available hydroxyls substituted with derivative groups can be grafted with one or more of the balance of the available hydroxyls. The primary —OH groups of the cyclodextrin molecules are more readily reacted than the secondary groups. However, the molecule can be substituted on virtually any position to form useful compositions. Broadly, we have found that a wide range of pendant substituent moieties can be used on the molecule. These derivatized cyclodextrin molecules can include alkylated cyclodextrin, hydrocarbylamino cyclodextrin, and others. The substituent moiety must include a region that provides compatibility to the derivatized material.

Amino and other azido derivatives of cyclodextrin having pendent thermoplastic polymer containing moieties can be used in the sheet, film or container of the invention. The sulfonyl derivatized cyclodextrin molecule can be used to generate the amino derivative from the sulfonyl group substituted cyclodextrin molecule via nucleophilic displacement of the sulfonate group by an azide ($N_3^{-1}$) ion. The azido derivatives are subsequently converted into substituted amino compounds by reduction. Such derivatives can be manufactured in symmetrical substituted amine groups (those derivatives with two or more amino or azido groups symmetrically disposed on the cyclodextrin skeleton or as a symmetrically substituted amine or azide derivatized cyclodextrin molecule. Due to the nucleophilic displacement reaction that produces the nitrogen containing groups, the primary hydroxyl group at the 6-carbon atom is the most likely site for introduction of a nitrogen-containing group. Examples of nitrogen containing groups that can be useful in the invention include acetylamino groups (—NHAc), alkylamino including methylamino, ethylamino, butylamino, isobutylamino, isopropylamino, hexylamino, and other alkylamino substituents. The amino or alkylamino substituents can further be reactive with other compounds that react with the nitrogen atom to further derivatize the amine group. Other possible nitrogen containing substituents include dialkylamino such as dimethylamino, diethylamino, piperidino and piperizino.

The cyclodextrin molecule can be substituted with heterocyclic nuclei including pendent imidazole groups, histidine, imidazole groups, pyridino and substituted pyridino groups.

Cyclodextrin derivatives can be modified with sulfur containing functional groups to introduce compatibilizing substituents onto the cyclodextrin. Sulfur containing groups manufactured based on sulfhydryl chemistry can be used to derivatize cyclodextrin. Such sulfur containing groups include hydroxyethylthio (—S—$CH_2CH_2OH$), imidazolylmethylthio, aminoalkylthio and others.

Applications and Uses

Long-established food packaging concepts are limited in their ability to extend the shelf-life of food products. Innovative food packaging concepts of the present invention interact with the environment inside the package and respond by changing their properties to maintain, adjust or improve the specific package headspace atmosphere or minimize food flavor loss to the package by "scalping" (i.e., uptake of volatile components by the polymeric package material from the food) thereby adding to product quality and extending shelf-life. The most notable group of technologies in use today for controlling package headspace oxygen is oxygen scavengers.

Multi-layer or composite packages, including gable top cartons, rely on essential layers of plastic that adds strength, barrier to other materials in the structure, and sealability. By way of example, gable-top milk and juice cartons are specifically disclosed in U.S. Pat. Nos. 5,816,487, 5,508,075, 5,616, 353, 6,193,827 and 6,372,317 as liquid tight containers. While these familiar gable-top cartons have been extensively used throughout the United States to contain juices, they are associated with some problems. Most interior polyolefin food contact or sealant layers scalp low molecular weight volatile organic aroma and flavor compounds from the food into the polymer, based on the sorption mechanism, has been and continues to be the subject of considerable attention and concern. Sorption may result in the loss of aroma and flavor volatiles associated with product quality. Anhydride-functionalized polymers modified with cyclodextrin effectively address problems related to poor organic barrier, surface hydrophobicity, and food flavor scalping over blends of conventional polyolefin. The invention described herein is particularly useful for containers constructed from laminates having a heat sealable internal food contact surface which enables significant flavor retention in fruit juices contained therein over the shelf life of the product.

In a properly designed food package, polymers should sorb a minimum amount of the critical flavorings while meeting all other performance requirements. Flavor loss due to sorption into the packaging polymer is generally assumed detrimental to product quality. In contrast, the fruit juice industry has designed liquid packaging to take advantage of sorption losses by striving to eliminate off-flavor precursors. The present invention relates to the use of the package food contact polymer layer, as illustrated by the juice example, to selectively remove undesirable off-flavors from the packaged foods while minimizing the loss of important flavoring compounds. The food package contact layer can be constructed of anhydride-functionalized polymers modified with cyclodextrin to effectively address problems related to poor organic aroma/flavor barrier, unwanted food flavor scalping, and removal of offensive odors/aromas from the interior of food packages produced by lipid oxidation, lipid hydrolysis and protein/amino acid breakdown of the packaged food. These active packaging polymer improvements are significant over conventional polyolefins and can considerably improve food taste over the shelf life of the product.

Packaging laminates have been used for many years for packaging food products. A widely known and used container is a paperboard-based structure, which is coated with various barrier and sealant materials. The contact layer for the food package of the present invention is heat sealable, thus providing a useful barrier structure for converting a stock material into cartons and similar food retaining packages which require heat sealing. The barrier structure of the present invention is particularly useful in packaging orange juice and similar citrus products. Anhydride-functionalized polymers modified with cyclodextrin lead to the improved interfacial interaction of conventional polyolefin polymers such as changing partition coefficients, polymer solubility coefficients due to hydrophobicity, greater crystallinity, and providing a selective scavenging function.

As the plastics industry has matured, it has developed numerous specialty foods packaging applications. A large number of single and multi-layer structures are available to store liquid or solid, food or non-food products. There continues to be a need for high performance, value-added packaging that is capable of maintaining or improving a specific internal package environment to assure improved quality, safety and shelf life while also achieving this objective from progressively thinner and transparent films. Current low oxygen-barrier packaging methods do not eliminate all the deteriorative chemical reactions produced by the stored foods or the packaging, so undesirable chemical by-products such as odor and taste taints continue to be produced in trace amounts, and these are effectively retained in the headspace of the package re-adsorbed by the product reducing product flavor quality and shelf life. When the ratio (proportion) or the total concentration of these compounds gets too far out of line, they contribute to food off-flavor.

Low and intermediate moisture level foods comprise a large part of the shelf stable foods such as cereals, crackers, cookies, salted snacks, etc. They contain fat, protein, starches and are subject to many deteriorative chemical reactions. The most important chemical changes are associated with hydrolytic reactions, enzymatic action, oxidative reactions, particularly lipid oxidation that alters the flavor of many lipid containing foods, and non-enzymatic browning. The chemical compounds produced from these reactions vary widely in their chemical and physical properties. They also vary in their impact on flavor. Some are responsible for pleasant aromas, while others produce offensive odors and flavors, often causing major problems in the storage of foods. So removing all of these compounds will cause flavor fade or removing some and not others will cause flavor imbalance—a bad tasting food.

In breakfast cereal, for example, accelerated shelf life studies using elevated temperature and low humidity produce a number of deteriorative chemical compounds. Cyclodextrins can minimize the headspace accumulation of volatile chemical family compounds (i.e., aromatic, alkanes, alkenes and ketones) in addition to aldehydes which cannot be removed by traditional antioxidants, and oxygen and aldehyde scavengers. Cyclodextrins can trap hydroperoxides and other compounds that are produced by oxidation of the sealant polymer during extrusion and are known to be detrimental to flavor quality. Further, grafted CD/polyolefin can selectively partition specific unwanted off-flavor compounds from the headspace surrounding the stored food into the sealant polymer layer without significantly affecting preferred desirable flavors and thereby preventing flavor fade. The CD pore is an effective trap for a broad spectrum of undesirable odors known to cause flavor defects in packaged foods.

A large proportion of fresh fruits, vegetables and cut flowers harvested are lost due to spoilage resulting from increased levels of ethylene gas in the package headspace. One of the ways to retard the ripening of fruits, vegetables and the quality of fresh flowers is to reduce the ethylene gas generated. The ethylene absorbing capacity of a LDPE film can be improved by having a thin contact inner layer with a functionalized LDPE and cyclodextrin. Cyclodextrin grafted polymers can be used as the food contact layer in a multilayer structure to extend product shelf life by reducing ethylene gas in the headspace surrounding the product and maintaining the appropriate humidity (generally greater than 80% RH) so undesirable wilting and shriveling doesn't take place. If the produce is sealed in an impermeable film, headspace $O_2$ levels will fall to low levels where annerobic respiration takes place forming undesirable odor and flavor compounds such as ethanol, acetaldehyde and organic acids. The advantage of grafting cyclodextrin onto the polyolefin is that a high concentration of CD can be used in the LDPE skin layer to improve the partitioning of ethylene gas and other organoleptic precursors from the headspace without degrading the intrinsic olefin barrier properties to moisture and gasses.

Beverage sealing elements and plastic screw cap closure shells generally contain one or more of the following thermoplastic materials: low density polyethylene and linear low density polyethylene (LDPE and LLDPE), high density polyethylene (HDPE), polypropylene (PP), ethylene vinyl acetate (EVA), polyvinylchloride (PVC) and polyvinylidene chloride (PVDC). High barrier liner materials are usually compounded compositions containing a thermoplastic (typically an olefin) and dispersed into the thermoplastic are elastomeric materials (typically a butyl rubber, a styrene butadiene rubber or a acrylic rubber) forming a thermoplastic elastomer material composition. These thermoplastic compositions are manufactured into shapes that allow them to function as a closure element for a standup pouch, jar or bottle of metal, glass or plastic. Screw cap plastic closure shells used to seal carbonated soft drinks, carbonated waters, etc. contain a two-component system comprising a PP screw cap shell and a monolayer liner usually produced from LDPE and EVA to provide a positive seal. Closure shells for non-carbonated beverages (e.g., still water) are manufactured from PP as a single piece functioning both as a screw cap and liner. Closure shells and liner compositions contain a number of additional performance additives—lubricants, antistats, plasticizers, heat stabilizers, antioxidants and pigments. One additive in particular, a common polymer lubricant called erucamide, improves the melt flow properties and reduces the adherence of the liner and shell to the bottle by decreasing release torque. Additives, which function at the surface of the polymer, are traditionally migratory and migration occurs over time. The surface of the polymeric shells and liners of the container can become sources of chemical precursors susceptible to ozonolysis from residual ozone.

Ozonation is commonly used worldwide for disinfecting drinking water stored in bottles. Residual ozone, typically ppb levels, remains in the water after bottling. Ozone reacts with unsaturated compounds forming unstable organic ozonides, which decompose rapidly into oxygen compounds, such as aldehydes, ketones, and peroxides, or react rapidly with oxidizing or reducing agents. The unsaturated chemical bonds in erucamide and oleamides, which migrates to the surface of the closure polymer and to a lesser extent unsaturated olefin monomers and oligomers exposed on the surface, producing an organoleptic defect often described as a "plastic" taste. The plastic off-taste can be associated with the presence of part per billion (ppb) levels of low human threshold organoleptic compounds, particularly $C_{1-30}$ aldehydes such as hexanal, heptanal, octanal, nonanal and decanal. Residual organoleptic volatiles, which are produced either from chemical oxidation by ozone or through thermo oxidation or photo oxidation of the liner or closure, can be effectively complexed by dispersing a functionalized polyolefin/CD composition within the liner or closure composition preventing their migration into the beverage. The present invention relates to container liner and shell compositions for retaining a foodstuff, beverage or pharmaceutical containing grafted cyclodextrin to reduce off-taste and odor organoleptic migrant and ingress permeants, thus improving taste of the stored product.

Fibers used in the present invention may be any polyolefin fibers known in the art. The thread-like fibers used in the invention are a composition comprising a functionalized polyolefin and grafted CD and polyolefin and are used to construct a nonwoven web comprised of one or more overlapping or interconnected fibers in a nonwoven manner. The fibers can be in the form of a long filament produced by spun melt or melt blown processes. Any nonwoven polyolefin fibers known in the art may be used in the present invention. The nonwoven webs may be used to construct bandages, disposable diapers and incontinent products, which have an improved odor control system to reduce or eliminate malodors caused by bodily fluids, such as blood, urine, menses, and the like. The functionalized polyolefin and grafted CD is homogeneously distributed throughout the fiber permitting malodor compounds to sorb into the fiber and then diffuse into the core of the fiber where they are complexed or effectively trapped by the CD throughout the entire fiber preventing their olfactory detection. The nonwoven web produced from functionalized polyolefin and grafted CD both changes the fibers wetting properties and effectively absorbs malodors and reduces olfactory detection.

Coated fibers could also comprise the outer layer of a multilayered fabric. A HazMat suit is one application. The coated fibers can be an active barrier to harmful vapors. Besides not allowing the gases to permeate through the fabric, the outer layer may trap some molecules. Polar molecules can be trapped within the cyclodextrin rings grafted onto the polymer. Acidic and basic groups on the polymer surface can be trap basic and acidic molecules, respectively, on the surface of the polymer. This is an added line of protection, rather than just a static barrier.

The present invention is directed to a process whereby improved anhydride-functionalized polymers, most notably, polyolefins grafted with maleic anhydride, are produced. For the improvement, the anhydride-functionalized polymer is modified by reacting with a CD under conditions that can convert all, when needed, or a portion of the anhydride groups to the corresponding half-ester. While it is known to graft diesters and half-esters of dicarboxylic acids or their anhydrides, such as maleic acid or maleic anhydride, onto various polymer substrates, polyolefin polymer compositions obtained by grafting CD onto a functionalized polyolefin exhibit a substantial increase in crystallinity and improve the interfacial interaction of conventional polyolefin polymers such as changing partition coefficients, surface energy due to hydrophobicity, improve polymer barrier, and providing a selective scavenging function. Cyclodextrin grafted polymers can be used in various structures and types of food packaging to extend product shelf life, in fiber to reduce malodors and as a barrier to organic permeants in variety of applications.

Alpha Cyclodextrin Masterbatch Compounding

A segmented barrel (seven segments) co-rotating compounding extruder (Haake 24 mm screw with a 28:1 L/D) was configured with two feed ports. One feed port is located in zone one and the other in zone three. The screw configuration had two mixing sections located in zone 2 and zone 4 downstream to the feed zones. The mixing section in zone 2 consisted of eight offset mixing elements followed by a half reverse element. The mixing section in zone 4 consisted of eight offset mixing elements. A vacuum port was located in zone 5. The last barrel segment was fitted with a standard three hole 3 mm strand die.

The alpha cyclodextrin (Wacker BioChem) was dried at 115° C. for 72 hours. The dried alpha cyclodextrin and maleic anhydride/polypropylene copolymer (DuPont Fusabond P MD-353D) having a melt flow rate (190° C./2.16 Kg) of 450 g/10 min were fed into the first feed zone using calibrated volumetric feeders. The second resin, Polypropylene homopolymer (ExxonMobile PP3546G) having a melt flow rate (230° C./2.16 Kg) of 1200 g/10 min was fed into the second feed zone using a third volumetric feeder. The output rate was 17 lbs an hour. The screw speed was 225 rpm, and the melt temperature was 184° C. Upon leaving the die, the extrudate passed through a water bath and was pelletized.

TABLE 1 alpha cyclodextrin master batch formulation
Masterbatch Formulation

| | |
|---|---|
| Alpha Cyclodextrin | 8.0 wt-% |
| Fusabond P MD-353D | 53.8 wt-% |
| PP3546G | 38.2 wt-% |

For the Blown Fiber Formulation Compounding, the second feed section on the co-rotating extruder was closed off. All other features of the barrel and screw configuration were the same as in the master batch compounding.

The two polypropylene homopolymer resins (ExxonMobile PP3546G and ExxonMobile PP3746G) with melt flows of 1200 g/10 min and 1475 g/10 min respectively were dry blended and fed into the first zone with one volumetric feeder. The master batch was also fed into the first zone with a second volumetric feeder. The output rate was 16.4 lbs an hour. The screw speed was 260 rpm, and the melt temperature was 184° C. In the compounding of the formulation for Web #3, the calcium carbonate was dry blended with the polypropylene homopolymers.

Nonwoven Blown Fiber Web Preparation

A series of nonwoven fiber webs with the formulations described in Table 2 were produced using a 6 inch melt blown fiber line utilizing a twin screw extruder. Processing parameters were adjusted for each formulation to produce suitable webs, that is to minimize fly and shot.

Die set up: 120 holes; 20 holes per inch; hole diameter 0.018 inches; Air gap 0.08 inches; and Setback 0.08 inches. The die used had 120 holes with 20 holes per inch. Hole diameter of 0.018 inches. Air Gap 0.08 inches. Setback 0.08 inches.

TABLE 3

Blown Fiber Process conditions
Blown Fiber Process Conditions

| Nonwoven Fiber Web Identification | Air Temp Degrees F. | Air Presure Inches of Water | Melt Temp Degrees F. | Melt Pressure PSI | Colector Distance Inches | Fiber Output grams/minute |
|---|---|---|---|---|---|---|
| Web # 1 | 340 | 55 | 347 | 37 | 36 | 94 |
| Web # 2 | 434 | 53 | 403 | 58 | 36 | 83 |
| Web # 3 | 434 | 53 | 371 | 57 | 36 | 70 |

Inhibition of Super Absorbent Polymer by Amphoteric Fiber

The current state of the art in disposable diapers, adult incontinence products, and feminine hygiene products involves the use of complex multicomponent articles. These articles utilize a number of different materials with different functions working together to fill several needs.

One of these functions is to wick away aqueous fluids from the surface of the article to the interior of the article leaving the surface dry. This function is performed by melt blown fibers. Another function is the adsorption of these same aqueous fluids in the interior of the article. This function is performed by super adsorbent polymers. While these polymers can adsorb up to 400 times their weight in deionized water, they can absorb only 30-40 times their weight in a 1% NaCl solution.

TABLE 2

Formulations to produce blown fiber webs
Blown Fiber Formulations

| Nonwoven Fiber Web Identification | Fiber Formulaion | Masterbatch | Calcium Carbonate | PP3546G | PP3746G |
|---|---|---|---|---|---|
| Web # 1 | Control Formulation | 0.0 wt-% | 0.0 wt-% | 42.5 wt-% | 57.5 wt-% |
| Web # 2 | Alpha Cyclodextrin | 12.5 wt-% | 0.0 wt-% | 37.2 wt-% | 50.3 wt-% |
| Web # 3 | Alpha Cyclodextrin + CaCO3 | 12.5 wt-% | 0.1 wt-% | 37.15 wt-% | 50.25 wt-% |

The nonwoven fibers are typically made of polyolefins and are hydrophobic in nature. In an attempt to improve the wicking function of the melt blown fiber, hydrophilic coatings have been developed for coating onto melt blown fibers. In many cases, these coatings have been found to dissolve into aqueous fluids and have a detrimental affect on the super absorbent polymer (SAP), that is decreasing the absorption capacity of the SAP.

Changes in the absorptive capacity of the SAP can be measured by testing the fugitive nature of coatings and fiber additives that might impact the function of SAP. Melt blown web samples were tested to determine the effect of Ca salt of maleic acid in the CD grafted Plexar (Amphoteric Resin) on the super absorbent polymer used in disposable diapers and incontinence products.

SAP Absorption Test Procedure

Normal saline solution was prepared by dissolving 4.5 gm of sodium chloride in 495.5 gm of deionized water. 1.0 gram of fiber from each formulation was packed into the bottom of a 40 ml headspace vial and 25 gm of normal saline solution was added. A vial of normal saline with 20 mg of $CaCO_3$ was also prepared as an example of worst case. The vials were capped and the fiber was extracted for 48 hours with two 10 minute periods of sonication.

For each test sample a glass fiber disc was place inside of a 10 ml syringe covering the throat of the syringe. Two hundred milligrams of SAP were then weighed into the syringe on top of the glass fiber (Ahlstrom Filtration. Grade 161).

10 ml of extraction solution (normal saline) was then placed into a 20 ml scintillation vial followed by the syringe with the glass fiber and SAP. The syringe is placed into the vial with the plunger-hole end up but without having the plunger in the syringe.

The syringe quickly fills to the 5 cc mark of the syringe and then gradually absorbs more water until it comes to equilibrium in about 3 hours.

TABLE 4

Volume of 1% NaCl absorbed by super absorbent polymer SAP Absorption Results are determined by the total volume in the syringe after 3 hours.

| Web # | Description | Saline Vol. in mL |
|---|---|---|
| Web #1 | PP Control | 7.6 |
| Web #3 | PP with 1% CD, Amphoteric | 7.8 |
| | Deionized water | >10 |
| | Normal saline | 7.6 |
| | Normal saline + 8 mg $CaCO_3$ | 6.0 |

The fiber with the calcium salt of maleic acid in the grafted cyclodextrin had no detrimental affect on the absorption of normal saline solution by the SAP. The volume absorbed can be read using the markings on the surface of the syringes.

Fugitive Cyclodextrin

An additional benefit of the amphoteric invention is the non-fugitive nature of the grafted cyclodextrin. Due to the polarity of the functionalized olefin and the grafted cyclodextrin molecule, a large part of the covalently bonded cyclodextrin is on the surface of the fiber. One of the short comings of other malodor control technologies including those which apply cyclodextrin as a dry, small particle to the surface of the fiber or coating the cyclodextrin onto the fiber using a cyclodextrin containing solution, is the cyclodextrin is fugitive and may be washed away by aqueous solutions such as urine insult thereby, reducing the effectiveness of the malodor control technology.

The non-fugitive feature of the grafted cyclodextrin may be shown analyzing the normal saline fiber sonication extracts from the inhibition of super absorbent polymer by amphoteric fiber test. Normal saline sonication extract samples were analyzed by flow inject atmospheric pressure ionization electrospray liquid chromatography mass spectrometry (API-ES LC/MS) using a Hewlett Packard Model 1100 series LC-MSD system including: 1100 bench-top mass selective detector (MSD) and Agilent 1050 series liquid chromatography (LC). 5 μL aliquots of the normal saline extracts of the webs in Table 4 were injected via the LC auto sampler and introduced into the API MS (900-1100 amu scan range) via the LC column loop path with no LC column in line. A 128 ppm α-CD in water standard was analyzed under the same conditions to validate the instrument response. A spike of 13 ppm α-CD was made to the PP control extract (no CD detected in the extract without the spike) and concentrations estimated from the spike addition response (m/z 995 (α-CD-Na adduct).

Quantitative Analysis of Normal Saline Extracts of Melt Blown Fiber by API-ES LC/MS The 13 ppm α-CD standard in water produced a robust signal with the characteristic m/z 995 sodium adduct ion. The saline suppressed the response considerably (about a factor of 70), but the 13 ppm spike to the PP control extract produced adequate signal from which to estimate concentrations in the extracts (method detection limit estimated at 2 ppm). Concentrations of α-CD detected in the extracts are given in Table 5.

TABLE 5

Concentrations of α-CD in the Saline Extracts

| Sample ID | m/z = 995 Area Counts | Cyclodextrin μg/mL (PPM)* |
|---|---|---|
| Web #1 | 143 | 0 |
| Web#3 | 1,243 | 2 |
| Solvent Blank | 0 | 0 |
| 13 PPM α-cyclodextrin | 418,800 | 13 |
| Web #1 spiked with 13 ppm α-CD | 6,513 | 13 |

*Based on spike addition response of 13 ppm to Web #1

The API-ES LC/MS data show 2 μg alpha cyclodextrin per mL of normal saline of was extracted from the fiber after 48 hours with two ten minute periods of sonication. The mass of extracted cyclodextrin represents 0.2% of the cyclodextrin in the 1.0 gram fiber samples. The extraction provides evidence that the cyclodextrin is non-fugitive.

Organic Vapor Sorption

The term sorption is generally used to describe the initial penetration and dispersal of permeant molecules into a polymer matrix and includes both adsorption and absorption as well as cluster formation. Sorption behavior is based on the relative strengths of the interactions between the permeant molecules and the polymer, or between the permeant molecules themselves within the polymer, or immobilization of permeant molecules by sites (e.g., positive and negative polymer groups and cyclodextrin) in the polymer. The sorption test method is most easily explained in terms of a melt blown fiber web structure surrounded by a fixed volume (e.g., glass bottle). The fiber web structure and the volume are initially completely free of the test solute inside the close-volume jar. At time zero, the test webs are exposed to a known concentration of test solute. The headspace concentration in the fixed volume surrounding the test structure is quantitated using gas chromatography. The sorptive rate and capacity of the melt blown web is determined from the headspace concentration in the closed vessel. The effectiveness of the fiber for reducing the solute headspace concentration is directly related to fiber sorption. Fiber having greater capacity to sorb malodor solutes (e.g., carboxylic acid and amines) is desirable for nonwoven materials used in hygiene products like diapers, incontinent products, feminine absorbent articles, wound dressings and the like.

The above experimental technique is used to quantitatively measure solute headspace concentration in the fixed-volume glass bottle. High-resolution gas chromatography (HRGC) operated with flame ionization detection (FID) is used to measure the headspace concentration. The solute in the headspace is quantitatively collected by solid phase microextraction (SPME) from the test bottle and analyzed by HRGC/FID. Solute bottle headspace concentration is determined from calibration standards and measured in μL of solute gas volume per fixed-volume bottle using Gas Laws equations.

Two solute standards, one containing amines and one containing carboxylic acids, were prepared separately by combining equal liquid volumes of each compound. The amine sorption standard for evaluating the melt blown test webs contains n-butylamine and dipropylamine. The carboxylic acid standard for evaluating the melt blown test webs contains n-butyric and isovaleric acid. All test solutes were obtained from Sigma-Aldrich, Milwaukee, Wis. The physical and chemical parameters of the amine and carboxylic acid solute standards are provided in Table 6 and Table 7.

TABLE 6

Amine physical and chemical test parameters.

| Permeant | Molecular Weight | Boiling Point (° C.) | Dissociation Constants in Aqueous Solutions | | |
|---|---|---|---|---|---|
| | | | Ka | pKa | Temp. ° C. |
| n-Butylamine | 73.14 | 78 | $1.69 \times 10^{-11}$ | 10.77 | 20 |
| Dipropylamine | 101.19 | 110 | $1.23 \times 10^{-11}$ | 10.91 | 25 |

TABLE 7

Carboxylic acid physical and chemical test parameters.

| Permeant | Molecular Weight | Boiling Point (° C.) | Dissociation Constants in Aqueous Solutions | | |
|---|---|---|---|---|---|
| | | | K | pK | Temp. ° C. |
| Butyric acid | 88.11 | 162 | $1.54 \times 10^{-3}$ | 4.81 | 20 |
| Isovaeric acid | 102.13 | 177 | $1.70 \times 10^{-3}$ | 4.77 | 25 |

Melt blown fiber web samples (web die cut into 1.75 inch specimens weighing 1.00 grams) are tested in a 250 mL IChem® bottle with Teflon® faced screw cap septa. Die cut test webs weighing 1.00 grams are placed inside the bottle, 0.2 μL of "neat" amine or carboxylic acid solute is injected into the bottle using a 0.5 μL syringe and the cap quickly tightened. The "neat" solute was injected onto the wall glass bottle so that the liquid solute does not come into direct contact with the fiber. The bottle is then placed into a 38° C. oven for 30 minutes prior to sampling the headspace by SPME. At the end of 30 minutes, the 250 mL IChem® bottle with Teflon faced screw cap septa is placed into a 38° C. water bath, the SPME need is injected through the cap septa and analyzed according to the methods in Tables 7 and 8.

Instrument Conditions

Table 8 and Table 9 provide the SPME HRGC/FID instrument conditions used to measure amine and carboxylic acid solutes in the test bottle headspace.

TABLE 8

Amine solute method conditions for gas chromatography and solid phase microextraction.

| Method: | Amines |
|---|---|
| Test solute: | Butylamine |
| | Dipropylamine |
| Sampling technique: | Solid Phase Microextraction (SPME) |
| Fiber: | Carbowax/Divinylbenzene (70 μm) |
| Sorb time: | 3 minutes |
| Desorb time: | 4 minute at 220° C. |
| Column: | Restek Rtx-5 |
| Dimensions: | 60M × 0.25 mm i.d. |
| Film thickness: | 0.25 μm |
| Carrier gas: | Helium |
| Head pressure: | 29 psi (42 cm/sec) |
| Injection mode: | Split (30 mL/min) |
| Detector: | Flame ionization (FID) |
| Detector temp: | 330° C. |
| Injector temp: | 265° C. |
| Initial temp: | 85° C. |
| Initial hold: | 0 minutes |
| Temperature rate: | 20° C./minute |
| Final temperature: | 185° C. |
| Final hold: | 1 minute |
| Total analysis time: | 6.0 minutes |

TABLE 9

Carboxylic acid solute method conditions for gas chromatography and solid phase microextraction.

| Method: | Carboxylic Acids |
|---|---|
| Test solute: | Butyric acid |
| | Isovaleric acid |
| Sampling technique: | Solid Phase Microextraction (SPME) |
| Fiber: | Polydimethylsiloxane/ Divinylbenzene (70 μm) |
| Sorb time: | 3 minutes |
| Desorb time: | 1 minute at 240° C. |
| Column: | Restek Rtx-5 |
| Dimensions: | 3 M × 0.25 mm i.d. |
| Film thickness: | 0.25 μm |
| Carrier gas: | Helium |
| Head pressure: | 29 psi (42 cm/sec) |
| Injection mode: | Split (30 mL/min.) |
| Detector: | Flame ionization (FID) |
| Detector temp: | 330° C. |
| Injector temp: | 240° C. |
| Initial temp: | 80° C. |
| Initial hold: | 0 minutes |
| Temperature rate: | 20° C./minute |
| Final temperature: | 185° C. |
| Final hold: | 1 minute |
| Total analysis time: | 6.25 minutes |

Solute headspace concentrations are calculated for each compound's calibration curve slope or response factor (RF). Concentrations are expressed as μL of solute gas volume per fixed-volume bottle using Gas Laws equations.

Concentration of Compound in ppm=Peak Area/Calibration Curve Slope

Compound Specific $RF$=Concentration of Compound in ppm/Peak Area

Concentration of Compound in ppm=Peak Area×$RF$

Example 1

Quantitative Sorption Performance of Melt Blown Web

Melt blown web reactivity and capacity was measured by placing test webs into a glass jar which is subsequently sealed and then filled with a reactive test vapor. Over the test time period of 30 minutes, the headspace vapor partitions into the fiber. The vapor concentration is measured in the headspace of the glass jar at a specified time (30 minutes). These data are used to quantitatively measure the sorptive web performance. The measured effect of the amphoteric technology and cyclodextrin in the fiber matrix is a reduction in the vapor concentration in the jar compared to PP fiber without the active technology. The partition coefficient and diffusion coefficient were very similar for test webs with and without the active technology since the PP polymer is greater than 90% by weight in the active technology samples. Melt blown test web performance is then a function of the sorption of the amine and carboxylic acid solutes in the melt blown web fiber resulting in a corresponding decrease in the headspace. A 0.2 μL injection of amine and carboxylic acid solutes were made into the glass jar wall and immediately sealed. The headspace was measured by taking a time composite sample 30 minutes after the amine standard or carboxylic acid standard injection using a three (3) minute SPME sampling interval. The SPME headspace samples are analyzed by HRGC/FID (method conditions Tables 8 and 9). Quantitative results are provided in Table 10.

TABLE 10

Headspace concentration of amines and carboxylic acid as parts per million - μL/L (volume/volume using Gas Laws) following 30 minutes of introduction for sealed glass jars containing web compositions containing cyclodextrin and/or cyclodextrin.

| | Amines | | Carboxylic Acids | |
|---|---|---|---|---|
| Sample ID | Butylamine PPM* | Propylamine PPM* | Butyric Acid PPM* | Isovaleric Acid PPM* |
| Web #1 | 61.2 | 34.4 | 39.6 | 24.4 |
| Web #2 | 6.65 | 7.90 | 36.2 | 24.0 |
| Web #3 | 9.17 | 12.6 | 35.6 | 22.8 |
| Bottle w/o Fiber | 99.0 | 71.3 | 107 | 89.7 |

PPM*= (μL/L – Vol./Vol. by Gas Laws)

This experiment provides the functional capacity estimates for the amphoteric and or grafted cyclodextrin containing melt blown fiber at 30 minutes. The melt blown fiber examples in Table 9 clearly demonstrate PP fiber containing adsorptive sites (positive and negative polymer groups and cyclodextrin), sorb and immobilize more headspace solute molecules than PP fiber without adsorptive or reactive sites. The headspace concentration at the test period (30 min) demonstrates the effectiveness of the test webs for removing amine and carboxylic acid volatile molecules from the headspace.

It should be recognized that the choice on calcium carbonate and the concentration used here is only one example of this invention and not intended to limit the choice of the metal cation or concentration used. Other divalent or trivalent metals may be used to alter reactivity, density or for cost reasons. Varying the number of carboxylic acid groups neutralized with the metal cation will alter the ratio between acid removal and base removal, thus allowing for tailored formulations for specific applications and uses.

Preparation of Discs Used for Permeation Testing

Compounding of a 10% Alpha Cyclodextrin in Maleic Anhydride Ethylene Copolymer

A 10% cyclodextrin master batch was prepared using a 24 mm co-rotating twin-screw extruder with a 29/1 L/D with two addition ports and two mixing section posterior to the addition ports. The extruder barrel was fitted with a 3 hole 3 mm strand die. The formulation consists of 10% alpha cyclodextrin, 56% maleic anhydride ethylene copolymer, and 34% NA 204-000 low-density polyethylene. The alpha cyclodextrin dried to a moisture level<0.1% and a maleic anhydride-ethylene copolymer with a melt index of 14 and a maleic anhydride concentration of 1.8% was fed into the first addition port. After the copolymer is melted and mixed with the cyclodextrin, NA 204-000, a low-density polyethylene with a melt index of 7 was fed into the second addition port. The combined material then passed through the second mixing section, extruded through the die, passed through a water bath and pelletized.

Compounding of Test Formulations

Test formulations were compounded using a Brabender® Mixing Bowl equipped with sigma mixing elements. Forty-one gram loads were mixed for 4 minutes at a bowl temperature of 150° C., and 80 rpm for 4 minutes.

| Control Formulation A: | |
|---|---|
| NA 204-000 (Equistar Chemical, LP) LDPE | 3.28 Gm |
| NA 420-000 (Equistar Chemical, LP) LDPE | 37.72 Gm |

| Alpha Cyclodextrin Formulation B: | |
|---|---|
| 10% Alpha Cyclodextrin Masterbatch | 3.28 Gm |
| NA 420-000 (Equistar Chemical, LP) LDPE | 37.72 Gm |

| Amphoteric Formulation C: | |
|---|---|
| Calcium Carbonated (Aldrich Chemical 23,9216) | 0.033 Gm |
| 10% Alpha Cyclodextrin Masterbatch | 3.28 Gm |
| NA 420-000 (Equistar Chemical, LP) LDPE | 37.69 Gm |

Injection Molding and Cutting Test Samples

Test samples were molded using a table top injection molding machine, Atlas Laboratory Mixing Molder equipped with a 4 cc mixing cup, and a 1.125 inch diameter×0.045 inch mold. The processing temperature was 170° C., 140 rpm, 2 minute residence time and mold temperature of 75° C. A 0.875 inch disc was cut from the center of the molded sample using a 0.875 inch hole punch.

Closed-Volume Permeation

Figure 1:
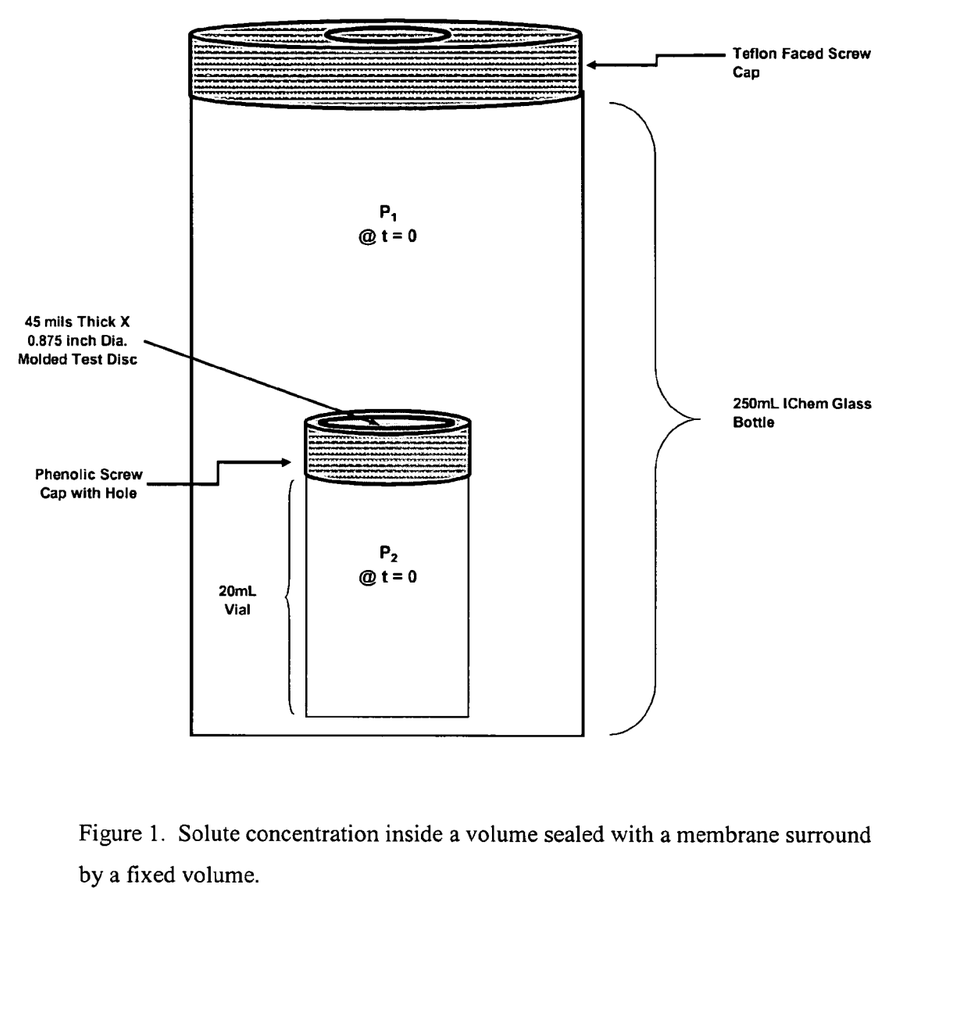
FIG. 1 illustrates a permeation method used to measure the performance of the invention
Figure 2:
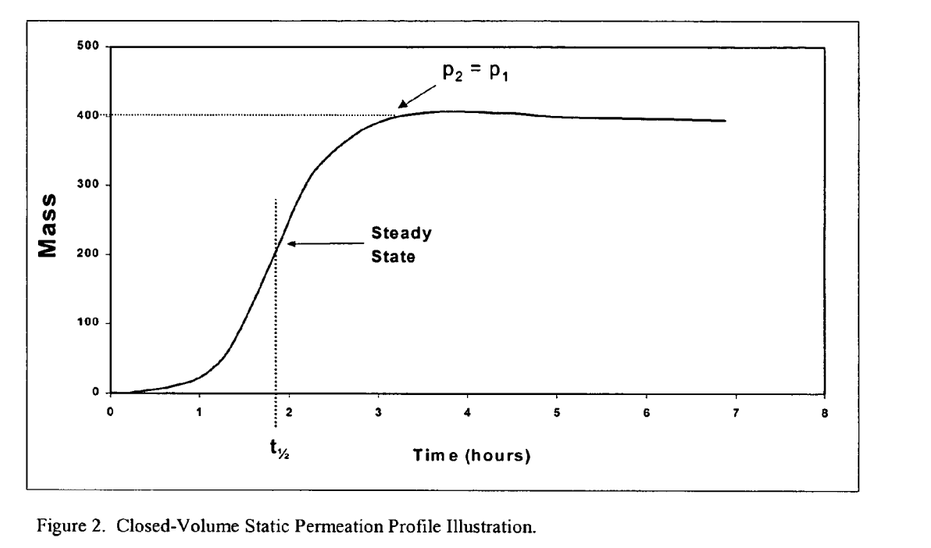
FIG. 2 is an example closed-volume static permeation profile illustrating the invention.

The permeation method used to measure the performance of the amphoteric invention is explained in terms of a membrane surrounded by a fixed volume. The membrane and the volume are initially free of solute. At time zero, the membrane is exposed to a concentration of solute. The concentration in the fixed volume is then measured over time for the solute. The membranes performance to retard solute transport into the fixed-volume is measured. This method is illustrated in FIG. 1. Permeation across a barrier membrane can be explained where the membrane at time zero ($t_o$) is initially free from permeant vapor. The penetrant pressure $p_2$ at the upstream face of the membrane is increased giving a concentration in the surface layer $c_2$. The downstream pressure, $p_1$, while measurable, is negligible at small times relative to the upstream pressure $p_2$. The amount of vapor permeating the barrier membrane increases linearly with time once steady state has been reached and continues until equilibrium is reached. At large times, the upstream pressure $p_2$ will equal the downstream pressure $p_1$. An example closed-volume static permeation profile illustrating $p_2 = p_1$ and $t_{1/2\,is}$ provided in FIG. 2.

Formulation A, B and C monolayer disc and permeant test mixtures are used to create a permeation profile. The time when $p_2 = p_1$ (equilibrium permeation) was determined to be approximately twenty (20) hours for Formulation A.

Analytical Method

The permeation method involves experimental techniques to measure organic molecule transport through a polymer structure, using a static concentration gradient. High-resolution gas chromatography (HRGC) operated with flame ionization detection (FID) is used to measure the cumulative downstream penetrant concentration. The solute in the headspace is quantitatively collected by solid phase microextraction (SPME) from the test bottle and analyzed by HRGC/FID. Solute bottle headspace concentration is determined from calibration standards and measured in µL of solute gas volume per fixed-volume bottle using Gas Laws equations.

Molded, die cut disc samples (45 mils thick×0.875 in. diameter and weighing 485 mg) are tested in a closed-volume vapor permeation device (refer to FIG. 1). The closed-volume permeation device consists of a 250 mL IChem® bottle with Teflon® faced screw cap septa (i.e., fixed volume) and a 20 mL glass vial fitted with phenolic screw cap with hole in the top of the cap. The phenolic screw cap has minimal permeant sorption. The cap is used to seal the test disc (membrane) on the 20 mL vial containing the penetrant pressure $p_2$ at time zero. The hole in the top of the cap permits the permeant mixture to permeate unimpeded through the disc into the fixed-volume with downstream pressure, $p_1$ at time zero. The membranes performance to retard solute transport into the fixed-volume is measured.

Two complex permeant standard mixtures, one containing amines and one containing carboxylic acids, were prepared separately by combining "neat" liquid volumes of each compound. All test compounds were obtained from Sigma-Aldrich, Milwaukee, Wis. The amine and carboxylic acid permeant mixtures are shown in Table 11.

TABLE 10

Carboxylic acid and Amine stock permeation standards.

| | b.p. (° C.) | MW | Density | Purity | uL | mg | % Composition |
|---|---|---|---|---|---|---|---|
| Standard #1 - Carboxylic Acid Stock Standard | | | | | | | |
| Ethanol | 78 | 44.05 | 0.790 | 99.5% | 150 | 118.5 | 51.2% |
| Valeraldehyde | 103 | 86.13 | 0.810 | 97.0% | 60 | 48.6 | 21.0% |
| Toluene | 110 | 92.14 | 0.865 | 99.0% | 50 | 43.3 | 18.7% |
| Butyric acid | 162 | 88.11 | 0.964 | 99.0% | 10 | 9.6 | 4.2% |
| Isovaleric acid | 177 | 102.13 | 0.937 | 99.0% | 12 | 11.2 | 4.9% |
| | | | | Total | 282 | 231.2 | 100.0% |
| | | | Approximate Density | | 0.820 | | |
| Standard #2 - Amine Stock Standard | | | | | | | |
| Ethanol | 21 | 44.05 | 0.785 | 99.5% | 150 | 117.8 | 57.7% |
| Valeraldehyde | 103 | 86.13 | 0.810 | 97.0% | 50 | 40.5 | 19.8% |
| Toluene | 153 | 114.19 | 0.818 | 99.0% | 20 | 16.4 | 8.0% |
| n-Butylamine | 78 | 73.14 | 0.740 | 99.5% | 20 | 14.8 | 7.2% |
| Dipropylamine | 110 | 101.19 | 0.738 | 99.0% | 20 | 14.8 | 7.2% |
| | | | | Total | 260 | 204.17 | 100.0% |
| | | | Approximate Density | | 0.785 | | |

Die cut test molded discs weighing 0.485 grams are capped over 20 mL glass vials containing 0.5 µL of "neat" amine or carboxylic acid solute, which is injected into the vial using a 0.5 µL syringe and the cap quickly tightened. The 20 mL vial is placed into a 250 mL IChem® bottle with Teflon faced screw cap septa. The bottle is then placed into a 50° C. oven for 6 hours prior to sampling the headspace by SPME and sampled again at 22.5 hours. The SPME needle is injected through the cap septa and analyzed according to the methods in Tables 8 and 9.

Permeation Test Results

This method involves experimental techniques designed to measure the flux of permeants across the test disc. The test methodology simulates accelerated shelf-life testing conditions by using an elevated cell storage temperature of 50° C. HRGC operated with an FID is used to measure the change in the cumulative permeant mixture concentration in the 250 mL IChem®. At the end of 6-hours and 22.5-hours, a sample is collected by solid phase microextraction (SPME) from the 250 mL IChem® and analyzed by HRGC/FID. The permeant concentration is determined from calibration standards and measured in μL/L or parts per million (vol./vol.) using gas laws. Table 12 contains the concentration $p_2$ of carboxylic acid and amine standards in the 20 mL IChem® at t=0 (relative to the 250 mL volume), and the concentration $p_1$ of permeants in the 250 mL IChem® at 6-hours and 22.5 hours. The permeation results for the three disc samples are provide in Tables 12 and 13.

TABLE 12

Concentration of Permeants Measured by Static Permeation using Headspace HRGC/FID in Formulations A, B and C - Permeation Cell Temperature Maintained at 50° C.

| Permeant | Conc. $p_2$ @ Time = 0 All Samples μL/L | $p_1$ @ Time = 6 Hours | | | $p_1$ @ Time = 22.5 Hours | | |
|---|---|---|---|---|---|---|---|
| | | Form. #A μL/L | Form. #B μL/L | Form. #C μL/L | Form. #A μL/L | Form. #B μL/L | Form. #C μL/L |
| Ethanol | 370 | 16 | 5.5 | 10 | 81 | 40 | 50 |
| Pentanal | 78 | 8.1 | 5.4 | 3.8 | 30 | 25 | 32 |
| Toluene | 65 | 16 | 11 | 8.2 | 34 | 32 | 38 |
| Butyric acid | 15 | 0.05 | 0.01 | ND | 4.6 | 3.3 | 2.1 |
| Isovaleric acid Total | 15 | 2.7 | ND | ND | 3.2 | 1.7 | 1.2 |

μL/L = Parts Per Million

TABLE 13

Concentration of Permeants Measured by Static Permeation using Headspace HRGC/FID in Formulations A, B and C - Permeation Cell Temperature Maintained at 50° C.

| Permeant | Conc. $p_2$ @ Time = 0 All Samples μL/L | $p_1$ @ Time = 6 Hours | | | $p_1$ @ Time = 22.5 Hours | | |
|---|---|---|---|---|---|---|---|
| | | Form. #A μL/L | Form. #B μL/L | Form. #C μL/L | Form. #A μL/L | Form. #B μL/L | Form. #C μL/L |
| Ethanol | 440 | 29 | 5.2 | 7.4 | 80 | 38 | 39 |
| Toluene | 72 | 9.0 | 8.3 | 12 | 31 | 36 | 35 |
| Butyamine | 33 | 0.89 | 0.08 | 0.12 | 0.15 | 0.06 | ND |
| Dipropylamine Total | 24 | 0.19 | ND | ND | 8.3 | ND | ND |

μL/L = Parts Per Million

The discs in Tables 12 and 13 demonstrate the "active" tri-functional trapping mechanism of the invention. Organic molecules are complexed/trapped in the cyclodextrin pore. The test discs contain alpha cyclodextrin having a cavity size of 5.7 A. Alpha's cavity size accommodates smaller molecules like ethanol and pentanal—also the carboxylic acids and amines—more readily than toluene. The permeation results support this. Basic molecules (e.g., butylamine and dipropylamine) are scavenged with the maleic/succinic acid groups on the polymer, and acidic molecules (e.g., butyric acid and isovaleric acid) are scavenged with the basic groups on the polymer. The permeation results in Tables 12 and 13 demonstrate the invention can act as an efficient barrier against a diverse mixture of hazardous and odorous vapors diffusing through the polymer membrane. The performance and specificity of the invention membrane can be changed by using different pore size cyclodextrins (e.g., alpha, beta and gamma) or cyclodextrin mixtures, and varying the number of carboxylic acid groups neutralized with the metal cation altering the ratio between acid removal and base removal, thus allowing for tailored formulations for specific applications and uses.

I claim:

1. A thermoplastic polymer composition, the composition capable of formation into thermoplastic fiber, film, fabric or web, consisting essentially of:

(a) a blend of a polyolefin resin and an anhydride-modified polyolefin resin, (b) a stoichiometric reaction product of a cyclodextrin and the anhydride-modified polyolefin resin, and (c) an alkaline earth metal on the anhydride-modified polyolefin resin;

wherein the polymer composition has a tri-functional trapping mechanism, the trapping mechanism consisting of carboxylic acid groups corresponding to the anhydride, the anhydride half-ester product of cyclodextrin, and a metal or organic group bonded to some portion of the anhydride half-acid groups; wherein the cyclodextrin is substantially free of an inclusion complex including residual polymer contaminant.

2. The thermoplastic polymer composition of claim 1, wherein the modified polyolefin resin comprises a polymethylene backbone comprising randomly substituted covalently bonded maleic groups comprising a cyclodextrin compound.

3. The thermoplastic polymer composition of claim 1 wherein the modified polyolefin resin comprises polyethylene or copolymers of polyethylene.

4. The thermoplastic polymer composition of claim 1 wherein the modified polyolefin resin comprises polypropylene or copolymers of polypropylene.

5. The thermoplastic polymer composition of claim 1 wherein the anhydride group is derived from maleic anhydride, citraconic anhydride, itaconic anhydride or their corresponding acids including fumaric acid.

6. The thermoplastic polymer composition of claim 1, wherein the modified polyolefin resin comprises an alpha, beta or gamma cyclodextrin or mixture thereof bonded to a backbone carbon of the polymer through a maleic moiety or to a carbon in a pendent group through a maleic moiety.

7. The thermoplastic polymer composition of claim 6 wherein the modified polyolefin resin comprises polyethylene or copolymers of polyethylene.

8. The thermoplastic polymer composition of claim 6 wherein the modified polyolefin resin comprises polypropylene or copolymers of polypropylene.

9. A thermoplastic polymer composition of claim 1, wherein the modified polyolefin resin comprises a cyclodextrin derivative having at least one substituent group on the cyclodextrin ring.

10. The thermoplastic polymer composition of claim 9 wherein the modified polyolefin resin comprises polyethylene or copolymers of polyethylene.

11. The thermoplastic polymer composition of claim 9 wherein the modified polyolefin resin comprises polypropylene or copolymers of polypropylene.

12. A thermoplastic film consisting essentially of:
(a) a blend of a polyolefin resin and an anhydride-modified polyolefin resin,
(b) a stoichiometric reaction product of a anhydride-modified polyolefin resin, and
(c) an alkaline earth metal on the anhydride-modified polyolefin resin to scavenge acidic molecules;
wherein the polymer composition has a tri-functional trapping mechanism, the trapping mechanism consisting of carboxylic acid groups corresponding to the anhydride, the anhydride half-ester product of cyclodextrin, and a metal or organic group bonded to some portion of the anhydride half-acid groups; wherein the cyclodextrin is substantially free of an inclusion complex including residual polymer contaminant and can retain the ability to trap or complex diffusing permeant in the central pore of the cyclodextrin.

13. The film of claim 12, wherein the modified polyolefin resin comprises a polymethylene backbone comprising randomly substituted covalently bonded groups maleic anhydride comprising a cyclodextrin compound.

14. The film of claim 12 wherein the modified polyolefin resin comprises polyethylene or copolymers of polyethylene.

15. The film of claim 12 wherein the modified polyolefin resin comprises polypropylene or copolymers of polypropylene.

16. The film of claim 12 wherein the anhydride group is derived from maleic acid, citraconic acid, itaconic acid or fumaric acid.

17. The film of claim 12, wherein the modified polyolefin resin comprises an alpha, beta or gamma cyclodextrin or mixtures thereof bonded to a backbone carbon of the polymer through a maleic moiety or to a carbon in a pendent group through a maleic moiety.

18. A film of claim 12, wherein the modified polyolefin resin comprises a cyclodextrin derivative having at least one substituent group on the cyclodextrin ring.

19. The film of claim 18 wherein the modified polyolefin resin comprises polyethylene.

20. The film of claim 18 wherein the modified polyolefin resin comprises polypropylene.

21. A thermoplastic fiber consisting essentially of:
(a) a blend of a polyolefin resin and an anhydride-modified polyolefin resin,
(b) a stoichiometric reaction product of a cyclodextrin and the anhydride-modified polyolefin resin, and
(c) an alkaline earth metal on the anhydride-modified polyolefin resin to scavenge acidic molecules;
wherein the polymer composition has a tri-functional trapping mechanism, the trapping mechanism consisting of carboxylic acid groups corresponding to the anhydride, the anhydride half-ester product of cyclodextrin, and a metal or organic group bonded to some portion of the anhydride half-acid groups; wherein the cyclodextrin is substantially free of an inclusion complex including residual polymer contaminant.

22. The fiber of claim 21, wherein the modified polyolefin resin comprises a polymethylene backbone comprising substituted covalently bonded groups comprising a cyclodextrin compound.

23. The fiber of claim 21 wherein the modified polyolefin resin comprises polyethylene.

24. The fiber of claim 21 wherein the modified polyolefin resin comprises polypropylene.

25. The fiber of claim 21 wherein the anhydride group is derived from maleic acid or fumaric acid.

26. The fiber of claim 21, wherein the modified polyolefin resin comprises an alpha, beta or gamma cyclodextrin or mixtures thereof bonded to a backbone carbon of the polymer through a maleic moiety or to a carbon in a pendent group through a maleic moiety.

27. The fiber of claim 26 wherein the modified polyolefin resin comprises polyethylene.

28. The fiber of claim 27 wherein the modified polyolefin resin comprises polypropylene.

29. A multi-layered fabric comprising fibers comprising the polymer of claim 1.

30. A nonwoven fabric comprising fibers comprising the polymer of claim 1.

31. The polymer composition of claim 1 wherein some portion of the carboxylic acid groups corresponding to the anhydride are neutralized with a metal cation.

32. The polymer composition of claim 12 wherein some portion of the carboxylic acid groups corresponding to the anhydride are neutralized with a metal cation.

33. The polymer composition of claim 21 wherein some portion of the carboxylic acid groups corresponding to the anhydride are neutralized with a metal cation.

* * * * *